United States Patent
Li et al.

(10) Patent No.: US 10,813,069 B2
(45) Date of Patent: Oct. 20, 2020

(54) TECHNIQUES AND APPARATUSES FOR USING DIFFERENT TIMING ADVANCE VALUES FOR DIFFERENT NUMEROLOGIES

(71) Applicant: QUALCOMM Incorporated, San Diego, CA (US)

(72) Inventors: Chih-Ping Li, San Diego, CA (US); Jing Jiang, San Diego, CA (US); Wanshi Chen, San Diego, CA (US); Tingfang Ji, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/024,417

(22) Filed: Jun. 29, 2018

(65) Prior Publication Data
US 2020/0008239 A1 Jan. 2, 2020

(51) Int. Cl.
*H04W 56/00* (2009.01)
*H04W 76/27* (2018.01)
(Continued)

(52) U.S. Cl.
CPC ........ *H04W 56/004* (2013.01); *H04B 7/0413* (2013.01); *H04B 7/0632* (2013.01);
(Continued)

(58) Field of Classification Search
CPC .................................................. H04W 56/004
See application file for complete search history.

(56) References Cited

U.S. PATENT DOCUMENTS

2017/0264409 A1    9/2017  Guo et al.
2017/0331577 A1   11/2017  Parkvall et al.
(Continued)

FOREIGN PATENT DOCUMENTS

WO    WO-2017217797 A1   12/2017
WO       2018060980 A1    4/2018
(Continued)

OTHER PUBLICATIONS

3GPP Draft; List of RAN1 Agreements, 3rd Generation Partnertship Project (3GPP), Mobile Competence Centre; 650, Route Des Lucioles; F-06921 Sophia-Antipolis Cedex; France, vol. RAN WG1. No. 20170901, Dec. 17, 2017 (Dec. 17, 2017), XP051364854, 195 Pages, Retrieved from the Internet: URL;http://www.3gpp.org/ftp/Meetings%5F3GPP%5FSYNC/RAN/Docs/ [retrieced on Dec. 17, 2017], pp. 37-63, pp. 110-111, pp. 127-138.
(Continued)

*Primary Examiner* — Jason E Mattis
(74) *Attorney, Agent, or Firm* — Harrity & Harrity/Qualcomm Incorporated

(57) ABSTRACT

Various aspects of the present disclosure generally relate to wireless communication. In some aspects, a user equipment (UE) may receive a timing advance (TA) command that includes a timing value for calculating a timing offset to be applied to adjust a timing of an uplink transmission; determine a numerology to be used to calculate the timing offset from the timing value; and calculate the timing offset using the timing value and the numerology, wherein the timing value corresponds to different timing offsets for different numerologies. Numerous other aspects are provided.

26 Claims, 10 Drawing Sheets

(51) Int. Cl.
*H04B 7/0413* (2017.01)
*H04B 7/06* (2006.01)
*H04L 5/00* (2006.01)
*H04W 72/04* (2009.01)
*H04W 74/08* (2009.01)

(52) U.S. Cl.
CPC ....... *H04L 5/0048* (2013.01); *H04W 72/0406* (2013.01); *H04W 72/0446* (2013.01); *H04W 74/085* (2013.01); *H04W 76/27* (2018.02)

(56) References Cited

U.S. PATENT DOCUMENTS

| | | | |
|---|---|---|---|
| 2019/0053182 A1* | 2/2019 | Choi | H04W 56/0045 |
| 2019/0090262 A1* | 3/2019 | Yan | H04W 72/042 |
| 2019/0104554 A1* | 4/2019 | Amuru | H04L 5/00 |
| 2019/0150125 A1* | 5/2019 | Bagheri | H04W 72/042 |
| 2019/0174513 A1* | 6/2019 | Loehr | H04W 72/1242 |

FOREIGN PATENT DOCUMENTS

| | | |
|---|---|---|
| WO | WO-2018059481 A1 | 4/2018 |
| WO | WO-2018061438 A1 | 4/2018 |

OTHER PUBLICATIONS

International Search Report and Written Opinion—PCT/US2019/037273—ISA/EPO—dated Sep. 18, 2019.
Nokia et al., "Remaining Details on RACH Procedure", 3GPP Draft; R1-1800557—Remaining Details on RACH Procedure, 3rd Generation Partnership Project (3GPP), Mobile Competence Centre, 650, Route Des Lucioles, F-06921 Sophia-Anti Polis, Cedex, France, vol. RAN WG1, No. Vancouver, Canada; Jan. 12, 2018 (Jan. 12, 2018), XP051384468, pp. 1-10, Retrieved from the Internet: URL:http://www.3gpp.org/ftp/tsg%5Fran/WG1%5FRL1/TSGR1%5FAH/NR%5FAH%5F1801/Docs/ [retrieved on Jan. 12, 2018].

* cited by examiner

TECHNIQUES AND APPARATUSES FOR USING DIFFERENT TIMING ADVANCE VALUES FOR DIFFERENT NUMEROLOGIES

FIELD OF THE DISCLOSURE

Aspects of the present disclosure generally relate to wireless communication, and more particularly to techniques and apparatuses for using different timing advance values for different numerologies.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method for wireless communication, performed by a user equipment (UE), may include receiving a timing advance (TA) command that includes a timing value for calculating a timing offset to be applied to adjust a timing of an uplink transmission; determining a numerology to be used to calculate the timing offset from the timing value; and calculating the timing offset using the timing value and the numerology, wherein the timing value corresponds to different timing offsets for different numerologies.

In some aspects, a UE for wireless communication may include one or more processors configured to receive a timing advance (TA) command that includes a timing value for calculating a timing offset to be applied to adjust a timing of an uplink transmission; determine a numerology to be used to calculate the timing offset from the timing value; and calculate the timing offset using the timing value and the numerology, wherein the timing value corresponds to different timing offsets for different numerologies.

In some aspects, a non-transitory computer-readable medium may store one or more instructions for wireless communication. The one or more instructions, when executed by one or more processors of a UE, may cause the one or more processors to receive a timing advance (TA) command that includes a timing value for calculating a timing offset to be applied to adjust a timing of an uplink transmission; determine a numerology to be used to calculate the timing offset from the timing value; and calculate the timing offset using the timing value and the numerology, wherein the timing value corresponds to different timing offsets for different numerologies.

In some aspects, an apparatus for wireless communication may include means for receiving a timing advance (TA) command that includes a timing value for calculating a timing offset to be applied to adjust a timing of an uplink transmission; means for determining a numerology to be used to calculate the timing offset from the timing value; and means for calculating the timing offset using the timing value and the numerology, wherein the timing value corresponds to different timing offsets for different numerologies.

In some aspects, a method for wireless communication, performed by a base station, may include determining a numerology to be used to calculate a timing offset to be applied to adjust a timing of an uplink transmission; determining a timing value for calculating the timing offset based at least in part on the numerology, wherein different timing values are determined for different numerologies; and transmitting a timing advance (TA) command that includes the timing value.

In some aspects, a base station for wireless communication may include one or more processors configured to determine a numerology to be used to calculate a timing offset to be applied to adjust a timing of an uplink transmission; determine a timing value for calculating the timing offset based at least in part on the numerology, wherein different timing values are determined for different numerologies; and transmit a timing advance (TA) command that includes the timing value.

In some aspects, a non-transitory computer-readable medium may store one or more instructions for wireless communication. The one or more instructions, when executed by one or more processors of a base station, may cause the one or more processors to determine a numerology to be used to calculate a timing offset to be applied to adjust a timing of an uplink transmission; determine a timing value for calculating the timing offset based at least in part on the numerology, wherein different timing values are determined for different numerologies; and transmit a timing advance (TA) command that includes the timing value.

In some aspects, an apparatus for wireless communication may include means for determining a numerology to be used to calculate a timing offset to be applied to adjust a timing of an uplink transmission; means for determining a timing value for calculating the timing offset based at least in part on the numerology, wherein different timing values are determined for different numerologies; and means for transmitting a timing advance (TA) command that includes the timing value.

Aspects generally include a method, apparatus, system, computer program product, non-transitory computer-readable medium, user equipment, base station, wireless communication device, and processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
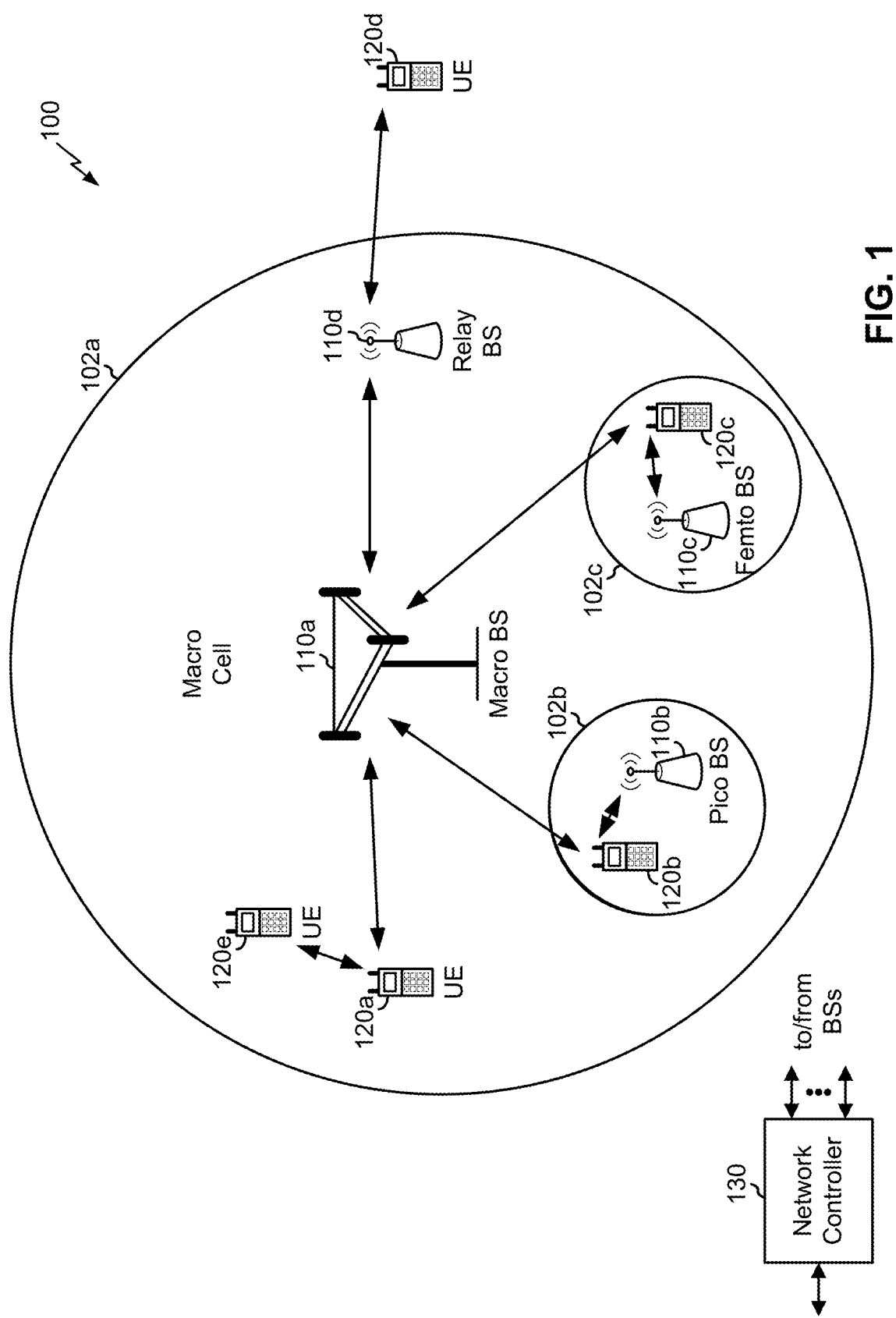
FIG. 1 is a block diagram conceptually illustrating an example of a wireless communication network, in accordance with various aspects of the present disclosure.

In wireless communication technologies like 4G/LTE and 5G/NR, a timing advance (TA) value is used to control a timing of uplink transmissions by a UE such that the uplink transmissions are received by a base station at a time that aligns with an internal timing of the base station. The base station may indicate the TA value to a UE by measuring a time difference between reception of uplink transmissions from the UE and a subframe timing used by the base station (e.g., by determining a difference between when the uplink transmissions were supposed to have been received by the base station, according to the subframe timing, and when the uplink transmissions were actually received), and by transmitting a TA command to instruct the UE to transmit future uplink communications earlier or later to reduce or eliminate the time difference and align timing between the UE and base station. The TA command is used to offset timing differences between the UE and the base station due to different propagation delays that occur when the UE is different distances from the base station. If TA commands were not used, then uplink transmissions from different UEs (e.g., located at different distances from the base station) may collide due to mistiming even if the uplink transmissions are scheduled for different subframes.

In LTE, the TA command includes a timing value used by the UE to calculate a timing offset for adjusting uplink transmissions. The timing value is expressed with a granularity of $T_S$, where the length of time represented by $T_S$ depends on a subcarrier spacing between adjacent carriers, also referred to as a numerology. In LTE, the subcarrier spacing/numerology is fixed at 15 kHz, and as a result, $T_S$ always represents the same length of time in LTE, and the UE can calculate the timing offset using this known length of time. For example, $T_S$ in LTE may be equal to $1/(FFT_{Size} \times SCS)$ seconds, where $FFT_{Size}$ represents a size of a Fast Fourier Transform, and where SCS represents a subcarrier spacing. In LTE, this value may be equal to $1/(2048 \times 15000)$ seconds, or $1/30720000$ seconds. In LTE, the timing value may always have a granularity of $16 \times T_S$. However, in 5G/NR, the UE may be configured to operate using different numerologies, such as 15 kHz or 30 kHz for enhanced mobile broadband (eMBB), 30 kHz or 60 kHz for ultra-reliable low latency communications (URLLC), and/or the like. In this case, using a fixed granularity corresponding to 15 kHz may result in timing errors for other numerologies, such as 30 kHz or 60 kHz. For example, if the granularity of the timing value depends on a 15 kHz subcarrier spacing for determination of the value of $T_S$, and if a different subcarrier spacing is being used for communications between the UE and the base station, then a resulting time alignment may compromise the cyclic prefix length (e.g., because different numerologies have different cyclic prefix lengths). This may result in poor performance, especially for higher modulation and coding schemes and stringent packet error rate requirements.

Some techniques and apparatuses described herein relate to determining a timing offset for adjusting a timing of uplink transmissions based on a timing value received in a TA command and a numerology (e.g., a numerology being used for communications between a UE and a base station, a default numerology, and/or the like). The same timing value in the TA command may correspond to different timing offsets for different numerologies because the granularity for the timing value is different for different numerologies. Thus, the base station may determine the timing value to be indicated in the TA command based on the numerology, and the UE may interpret the timing value (e.g., to calculate the timing offset) based on the numerology. In this way, timing errors may be reduced.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples are possible and may differ from what was described with regard to FIG. 1.

Figure 2:
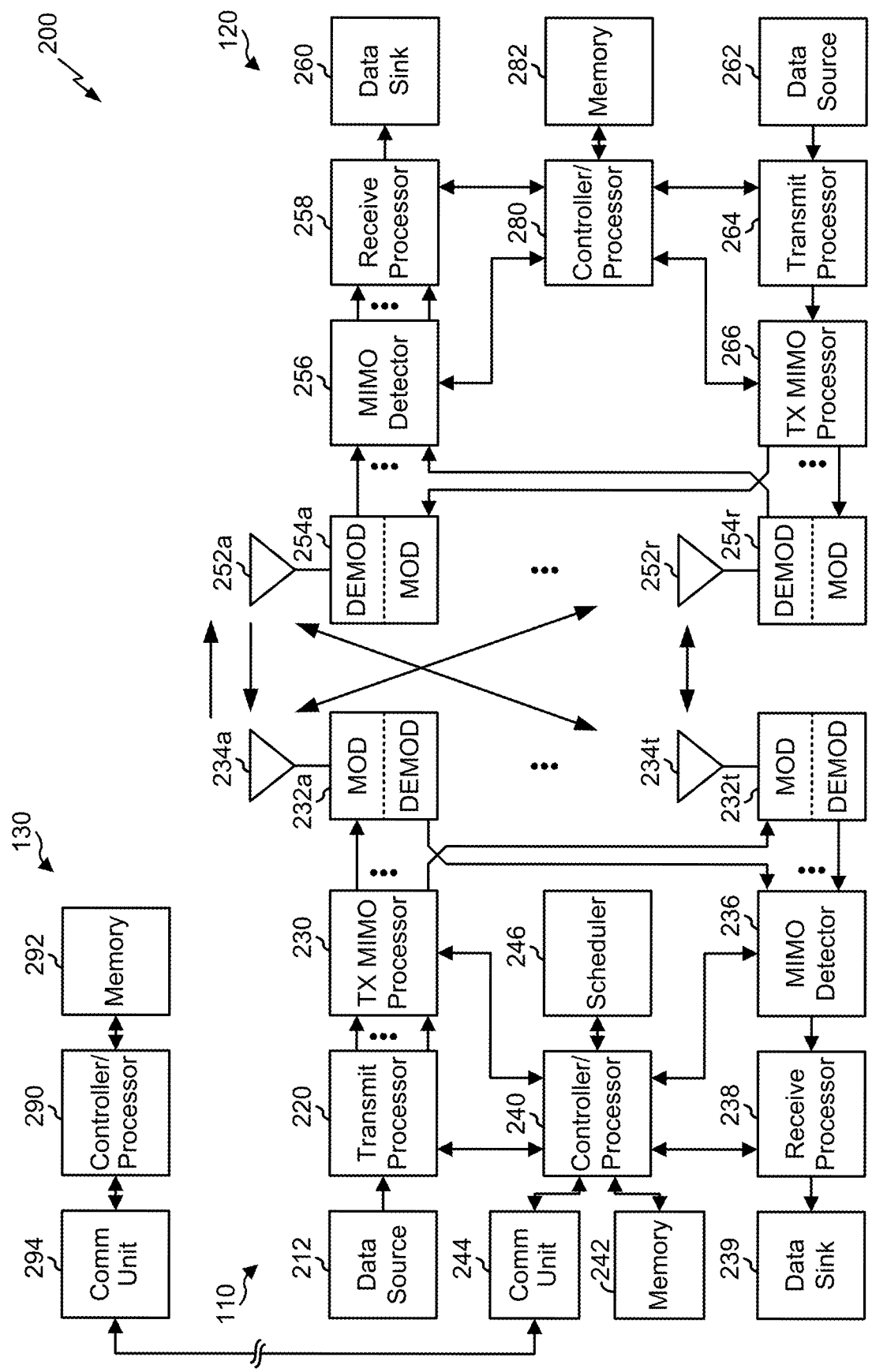
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), etc. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with using different timing advance values for different numerologies, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. A scheduler 246 may schedule UEs for data transmission on the downlink and/or uplink.

Figure 9:
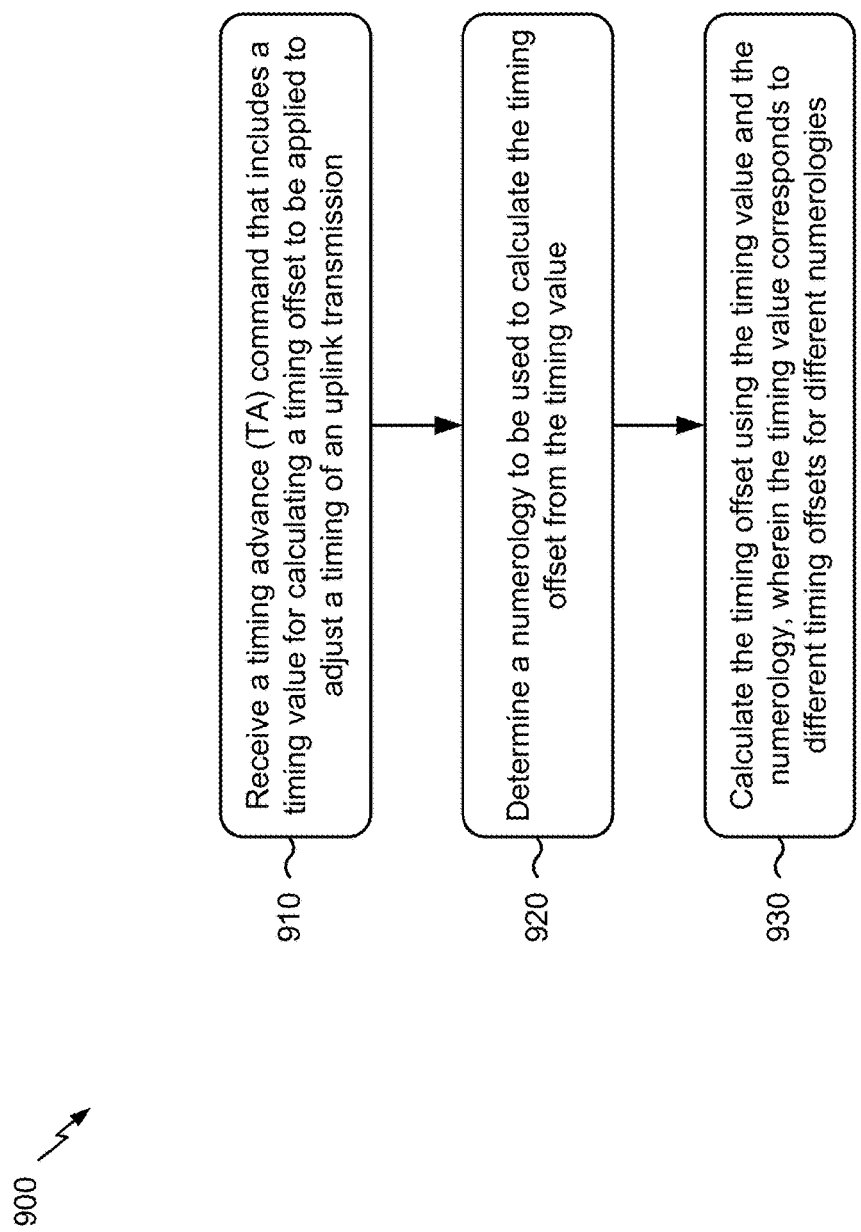
FIGS. 9 and 10 are diagrams illustrating example processes relating to using different timing advance values for different numerologies, in accordance with various aspects of the present disclosure.

The stored program codes, when executed by processor 280 and/or other processors and modules at UE 120, may cause the UE 120 to perform operations described with respect to process 900 of FIG. 9 and/or other processes as described herein. The stored program codes, when executed by processor 240 and/or other processors and modules at base station 110, may cause the base station 110 to perform operations described with respect to process 1000 of FIG. 10 and/or other processes as described herein. A scheduler 246 may schedule UEs for data transmission on the downlink and/or uplink.

In some aspects, UE 120 may include means for receiving a timing advance (TA) command that includes a timing value for calculating a timing offset to be applied to adjust a timing of an uplink transmission; means for determining a numerology to be used to calculate the timing offset from the timing value; means for calculating the timing offset using the timing value and the numerology, wherein the timing value corresponds to different timing offsets for different numerologies; and/or the like. In some aspects, such means may include one or more components of UE 120 described in connection with FIG. 2.

In some aspects, base station 110 may include means for determining a numerology to be used to calculate a timing offset to be applied to adjust a timing of an uplink transmission; means for determining a timing value for calculating the timing offset based at least in part on the numerology, wherein different timing values are determined for different numerologies; means for transmitting a timing advance (TA) command that includes the timing value; and/or the like. In some aspects, such means may include one or more components of base station 110 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of processor 280.

As indicated above, FIG. 2 is provided merely as an example. Other examples are possible and may differ from what was described with regard to FIG. 2.

Figure 3:
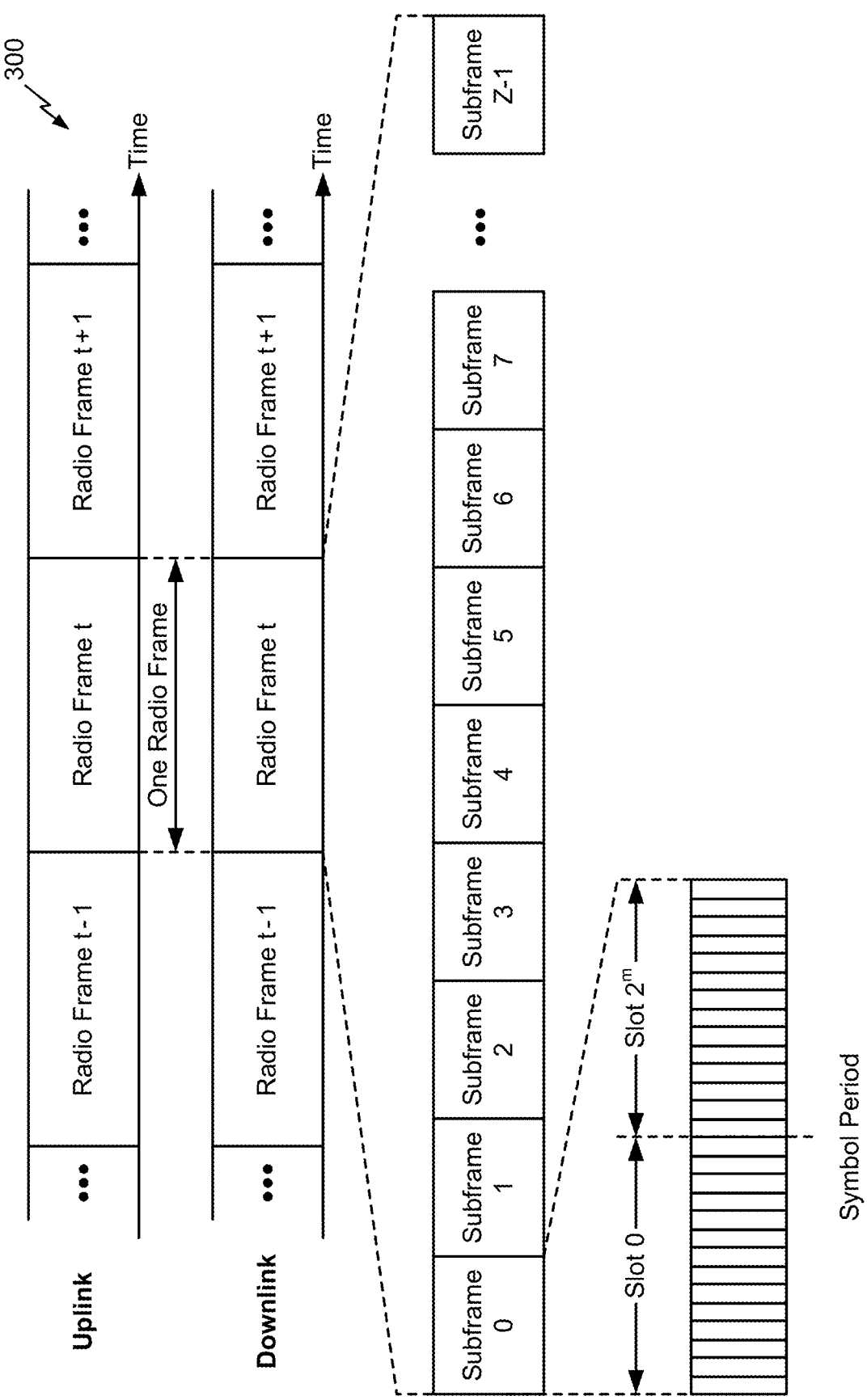
FIG. 3 is a block diagram conceptually illustrating an example of a frame structure in a wireless communication network, in accordance with various aspects of the present disclosure.

FIG. 3 shows an example frame structure 300 for FDD in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z-1). Each subframe may have a predetermined duration (e.g., 1 ms) and may include a set of slots (e.g., $2^m$ slots per subframe are shown in FIG. 3, where m is a numerology used for a transmission, such as 0, 1, 2, 3, 4, and/or the like). Each slot may include a set of L symbol periods. For example, each slot may include fourteen symbol periods (e.g., as shown in FIG. 3), seven symbol periods, or another number of symbol periods. In a case where the subframe includes two slots (e.g., when m=1), the subframe may include 2L symbol periods, where the 2L symbol periods in each subframe may be assigned indices of 0 through 2L-1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3 may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

As indicated above, FIG. 3 is provided as an example. Other examples are possible and may differ from what was described with regard to FIG. 3.

Figure 4:
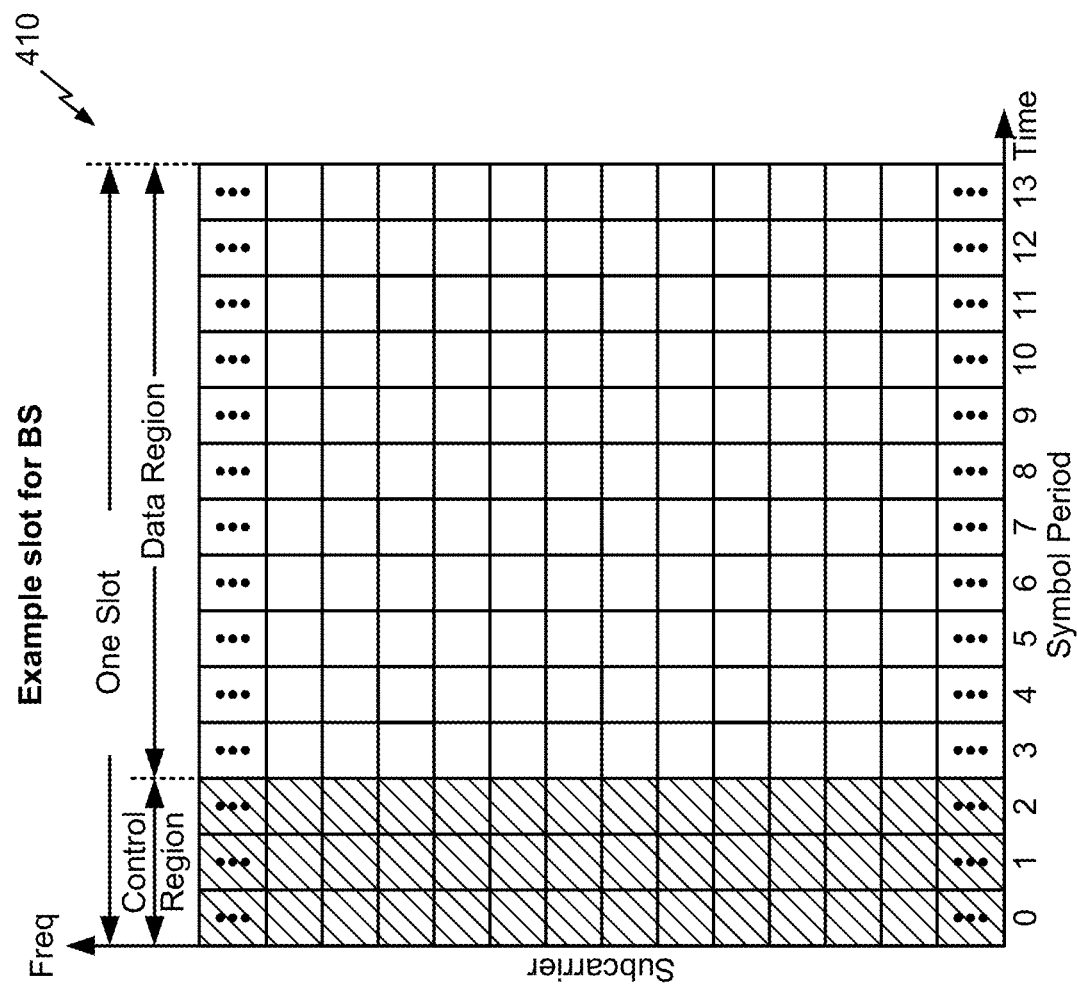
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q-1 may be defined, where Q may be equal to 4, 6, 8, 10, or some other value. Each interlace may include slots that are spaced apart by Q frames. In particular, interlace q may include slots q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples are possible and may differ from what was described with regard to FIG. 4.

In wireless communication technologies like 4G/LTE and 5G/NR, a timing advance (TA) value is used to control a timing of uplink transmissions by a UE (e.g., UE 120 and/or the like) such that the uplink transmissions are received by a base station (e.g., base station 110 and/or the like) at a time that aligns with an internal timing of the base station. The base station may indicate the TA value to a UE by measuring a time difference between reception of uplink transmissions from the UE and a subframe timing used by the base station (e.g., by determining a difference between when the uplink transmissions were supposed to have been received by the base station, according to the subframe timing, and when the uplink transmissions were actually received), and by transmitting a TA command to instruct the UE to transmit future uplink communications earlier or later to reduce or eliminate the time difference and align timing between the UE and base station. The TA command is used to offset timing differences between the UE and the base station due to different propagation delays that occur when the UE is different distances from the base station. If TA commands were not used, then uplink transmissions from different UEs (e.g., located at different distances from the base station) may collide due to mistiming even if the uplink transmissions are scheduled for different subframes.

In LTE, the TA command includes a timing value used by the UE to calculate a timing offset for adjusting uplink transmissions. The timing value is expressed with a granularity of $T_S$, where the length of time represented by $T_S$ depends on a subcarrier spacing between adjacent carriers, also referred to as a numerology. In LTE, the subcarrier spacing/numerology is fixed at 15 kHz, and as a result, $T_S$ always represents the same length of time in LTE, and the UE can calculate the timing offset using this known length of time. For example, $T_S$ in LTE may be equal to $1/(FFT_{Size} \times SCS)$ seconds, where $FFT_{Size}$ represents a size of a Fast Fourier Transform, and where SCS represents a subcarrier spacing. In LTE, this value may be equal to $1/(2048 \times 15000)$ seconds, or $1/30720000$ seconds. In LTE, the timing value may always have a granularity of $16 \times T_S$. However, in 5G/NR, the UE may be configured to operate using different numerologies, such as 15 kHz or 30 kHz for enhanced mobile broadband (eMBB), 30 kHz or 60 kHz for ultra-reliable low latency communications (URLLC), and/or the like. In this case, using a fixed granularity corresponding to 15 kHz may result in timing errors for other numerologies, such as 30 kHz or 60 kHz. For example, if the granularity of the timing value depends on a 15 kHz subcarrier spacing for determination of the value of $T_S$, and if a different subcarrier spacing is being used for communications between the UE and the base station, then a resulting time alignment may compromise the cyclic prefix length (e.g., because different numerologies have different cyclic prefix lengths). This may result in poor performance, especially for higher modulation and coding schemes and stringent packet error rate requirements.

Some techniques and apparatuses described herein relate to determining a timing offset for adjusting a timing of uplink transmissions based on a timing value received in a TA command and a numerology (e.g., a numerology being used for communications between a UE and a base station, a default numerology, and/or the like). The same timing value in the TA command may correspond to different timing offsets for different numerologies because the granularity for the timing value is different for different numerologies. Thus, the base station may determine the timing value to be indicated in the TA command based on the numerology, and the UE may interpret the timing value (e.g., to calculate the timing offset) based on the numerology. In this way, timing errors may be reduced.

Figure 5:
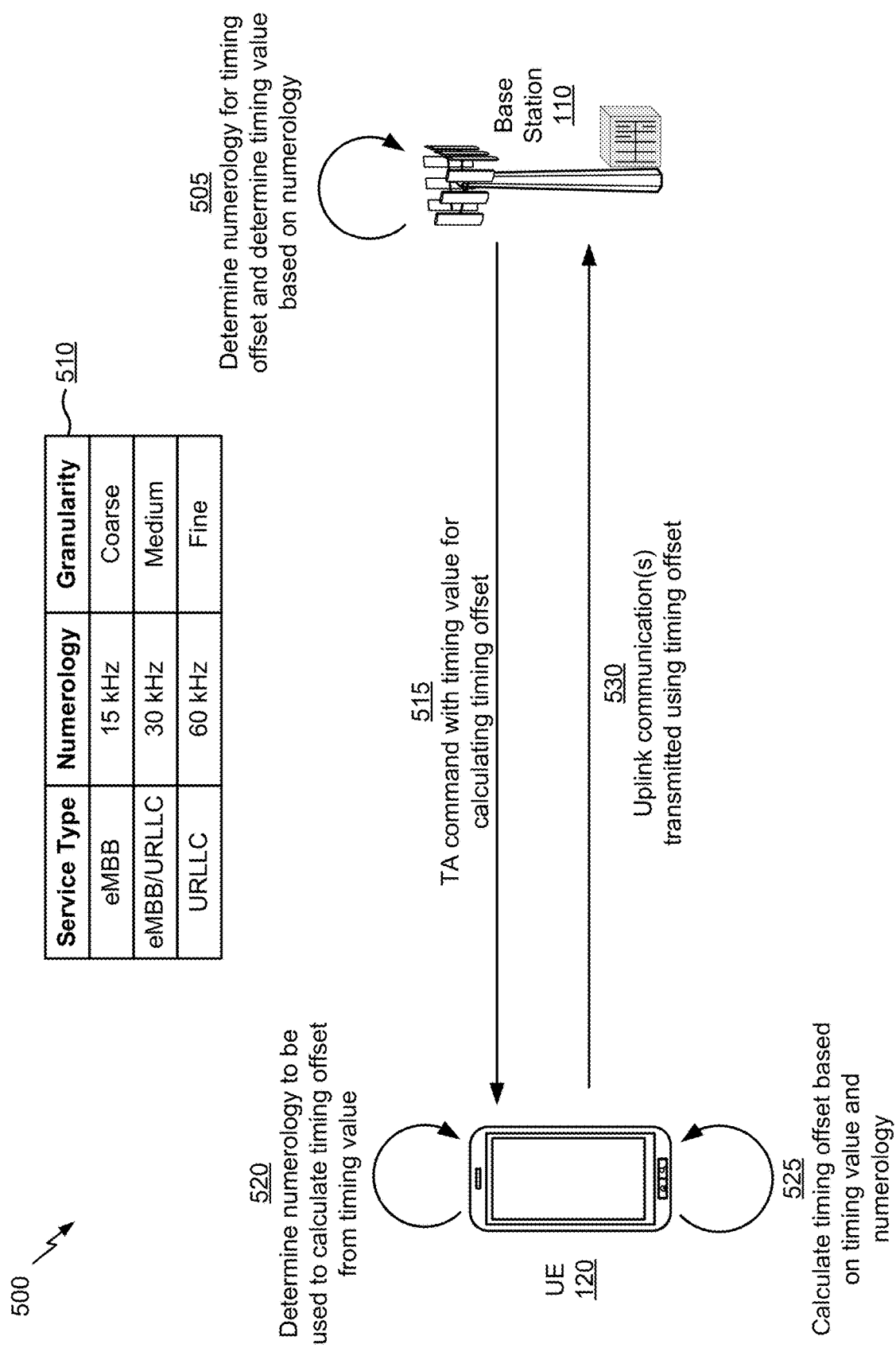
FIGS. 5-8 are diagrams illustrating examples of using different timing advance values for different numerologies, in accordance with various aspects of the present disclosure.

FIG. 5 is a diagram illustrating an example 500 of using different timing advance values for different numerologies, in accordance with various aspects of the present disclosure.

As shown by reference number 505, a base station 110 may determine a numerology to be used to calculate a timing offset to be applied by a UE 120 to adjust a timing of an uplink transmission, and may determine a timing value for calculating the timing offset based at least in part on the numerology. In some aspects, the base station 110 may determine different timing values (e.g., to indicate the same timing offset) for different numerologies. For example, different numerologies may be associated with different granularities (e.g., representing a different length of time or unit of time) for the timing value. In this case, the base station 110 may determine a granularity of the timing value based at least in part on the numerology, and may set the timing value to indicate a desired timing offset using the determined granularity.

As an example, a lower numerology (e.g., a lower subcarrier spacing), such as 15 kHz, may be associated with a coarser granularity (e.g., 16×$T_S$), and a higher numerology (e.g., a higher subcarrier spacing), such as 60 kHz, may be associated with a finer granularity (e.g., 4×$T_S$). In this case, the same timing value (e.g., the same sequence of bits) may represent different timing offsets for different numerologies, depending on a granularity that corresponds to the numerology. Similarly, different timing values (e.g., different sequences of bits) for different numerologies may represent the same timing offset. In this way, mistiming may be reduced.

In some aspects, the same granularity for the timing value may be used across multiple cells (e.g., of a single base station 110 or across multiple base stations 110). For example, if the multiple cells are included in the same TA group, and the TA group supports URLLC, then the same granularity may be used for the timing value across those cells. Similarly, if the multiple cells are included in the same TA group, and the TA group does not support URLLC, then the same granularity may be used for the timing value across those cells. In some aspects, a first TA group that supports URLLC may use a different granularity for the timing value than a second TA group that does not support URLLC.

As shown by reference number 510, as an example, a service type of eMBB may use a numerology of 15 kHz or 30 kHz (e.g., when URLLC is not configured for the UE 120). Similarly, a service type of URLLC may use a numerology of 30 kHz or 60 kHz (e.g., when URLLC is configured for the UE 120). In some aspects, a numerology of 15 kHz may be associated with a coarser granularity than a numerology of 30 kHz and 60 kHz. Additionally, or alternatively, a numerology of 30 kHz may be associated with a finer granularity than a numerology of 15 kHz, and may be associated with a coarser granularity than a numerology of 60 kHz. Additionally, or alternatively, a numerology of 60 kHz may be associated with a finer granularity than a numerology of 15 kHz and 30 kHz. In this way, mistiming may be reduced.

In some aspects, a base station 110 and/or a UE 120 may support both eMBB and URLLC services. In this case, the base station 110 and/or the UE 120 may maintain (e.g., store, update, and/or the like) a single TA loop for multiple service types (e.g., eMBB, URLLC, and/or the like), or may maintain separate, independent TA loops for different service types.

If the base station 110 maintains a single TA loop, then the base station 110 may determine and transmit a single timing value in the TA command, and the UE 120 may use the single timing value to calculate timing offsets for multiple numerologies. For example, the UE 120 may use the single timing value to calculate a timing offset for URLLC services (e.g., using a numerology of 30 kHz or 60 kHz) and eMBB services (e.g., using a numerology of 15 kHz or 30 kHz). In this case, the base station 110 may determine the single timing value using the largest numerology (e.g., the highest numerology) of the multiple numerologies. For example, the base station 110 may determine the single timing value using a granularity associated with a numerology used for URLLC services (e.g., rather than eMBB services). The UE 120 may then use the single timing value to derive different timing offsets for different numerologies. In this way, timing errors may be reduced for both eMBB services and URLLC services by using a numerology associated with URLLC, which is more sensitive to timing differences.

If the base station 110 maintains different TA loops for different numerologies, then the base station 110 may determine and transmit multiple timing values to the UE 120. For example, the base station 110 may determine a first timing value for a first numerology (e.g., using a first granularity corresponding to the first numerology) and a second timing value for a second numerology (e.g., using a second granularity corresponding to the second numerology), and may transmit the first timing value and the second timing value to the UE 120. In some aspects, the first timing value and the second timing value may be indicated in the same TA command. In some aspects, the first timing value and the second timing value may be indicated in different TA commands. The UE 120 may use the first timing value to calculate a first timing offset for a first numerology, and may use the second timing value to calculate a second timing offset for a second numerology. For example, the UE 120 may use the first timing value to calculate a first timing offset for URLLC services (e.g., using a numerology of 30 kHz or 60 kHz), and may use the second timing value to calculate a second timing offset for eMBB services (e.g., using a numerology of 15 kHz or 30 kHz). In this way, timing errors may be reduced for both eMBB services and URLLC services.

As shown by reference number 515, the base station 110 may transmit, and the UE 120 may receive, a TA command that includes the timing value. In some aspects, the TA command may be included in a media access control (MAC) control element (CE), as described in more detail below in connection with FIG. 6. In some aspects, the TA command may be included in a random access response (RAR), as described in more detail below in connection with FIG. 7.

As shown by reference number 520, the UE 120 may determine a numerology to be used to calculate the timing offset from the timing value. In some aspects, the numerology to be used may be indicated in a radio resource control (RRC) message, as described in more detail below in connection with FIG. 6. In some aspects, the numerology to be used may be a default numerology, as described in more detail below in connection with FIG. 7.

As shown by reference number 525, the UE 120 may calculate a timing offset, to be applied to adjust a timing of an uplink transmission, using the timing value and the numerology. In some aspects, the timing value corresponds to different timing offsets for different numerologies. For example, different numerologies may correspond to different granularities for the timing value. The UE 120 may determine a granularity for the timing value based at least in part on the determined numerology, and may calculate the timing offset using the received timing value and a granularity for the received timing value.

As shown by reference number 530, the UE 120 may transmit, and the base station 110 may receive, an uplink communication. The UE 120 may adjust the timing of the uplink transmission (e.g., a time at which the uplink transmission is transmitted) using the timing offset. In this way, a time difference at the base station 110 between reception of uplink communications from the UE 120 and a subframe timing used by the base station 110 may be reduced or eliminated, and timing between the UE 120 and the base station 110 may be aligned and/or synchronized. In this way, the likelihood of collision between uplink transmissions from different UEs 120 may be reduced, and interference between such UEs 120 may be reduced or eliminated.

As indicated above, FIG. 5 is provided as an example. Other examples are possible and may differ from what was described with respect to FIG. 5.

Figure 6:

FIG. 6 is a diagram illustrating an example 600 of using different timing advance values for different numerologies, in accordance with various aspects of the present disclosure.

As shown by reference number 605, a base station 110 may determine a numerology to be used to calculate a timing offset to be applied by a UE 120 to adjust a timing of an uplink transmission, and may determine a timing value for calculating the timing offset based at least in part on the numerology, in a similar manner as described above in connection with FIG. 5.

As shown by reference number 610, the base station 110 may transmit, and the UE 120 may receive, an RRC message that indicates the numerology. In this case, the numerology may be a numerology being used for communications between the UE 120 and the base station 110. For example, the numerology may be 15 kHz or 30 kHz for eMBB communications between the UE 120 and the base station 110, or may be 30 kHz or 60 kHz for URLLC communications between the UE 120 and the base station 110.

As shown by reference number 615, the base station 110 may transmit, and the UE 120 may receive, a TA command that includes the timing value, in a similar manner as described above in connection with FIG. 5. As further shown, the TA command may be included in a MAC control element. For example, after the UE 120 is in connected mode, the base station 110 may continue to estimate the timing value, and may send the timing value in a TA command transmitted in a MAC control element if timing correction is required.

As shown by reference number 620, the UE 120 may determine a numerology to be used to calculate the timing offset from the timing value, and may calculate a timing offset, to be applied to adjust a timing of an uplink transmission, using the timing value and the numerology, in a similar manner as described above in connection with FIG. 5. As shown in FIG. 6, when the TA command is received in a MAC control element, the UE 120 may determine the numerology using the indication in the RRC message.

As shown by reference number 625, the UE 120 may transmit, and the base station 110 may receive, an uplink communication with a timing adjusted using the timing offset, in a similar manner as described above in connection with FIG. 5. In this way, a time difference at the base station 110 between reception of uplink communications from the UE 120 and a subframe timing used by the base station 110 may be reduced or eliminated, a timing between the UE 120 and the base station 110 may be aligned and/or synchronized, a likelihood of collision between uplink transmissions from different UEs 120 may be reduced, interference between such UEs 120 may be reduced or eliminated, and/or the like.

As indicated above, FIG. 6 is provided as an example. Other examples are possible and may differ from what was described with respect to FIG. 6.

Figure 7:
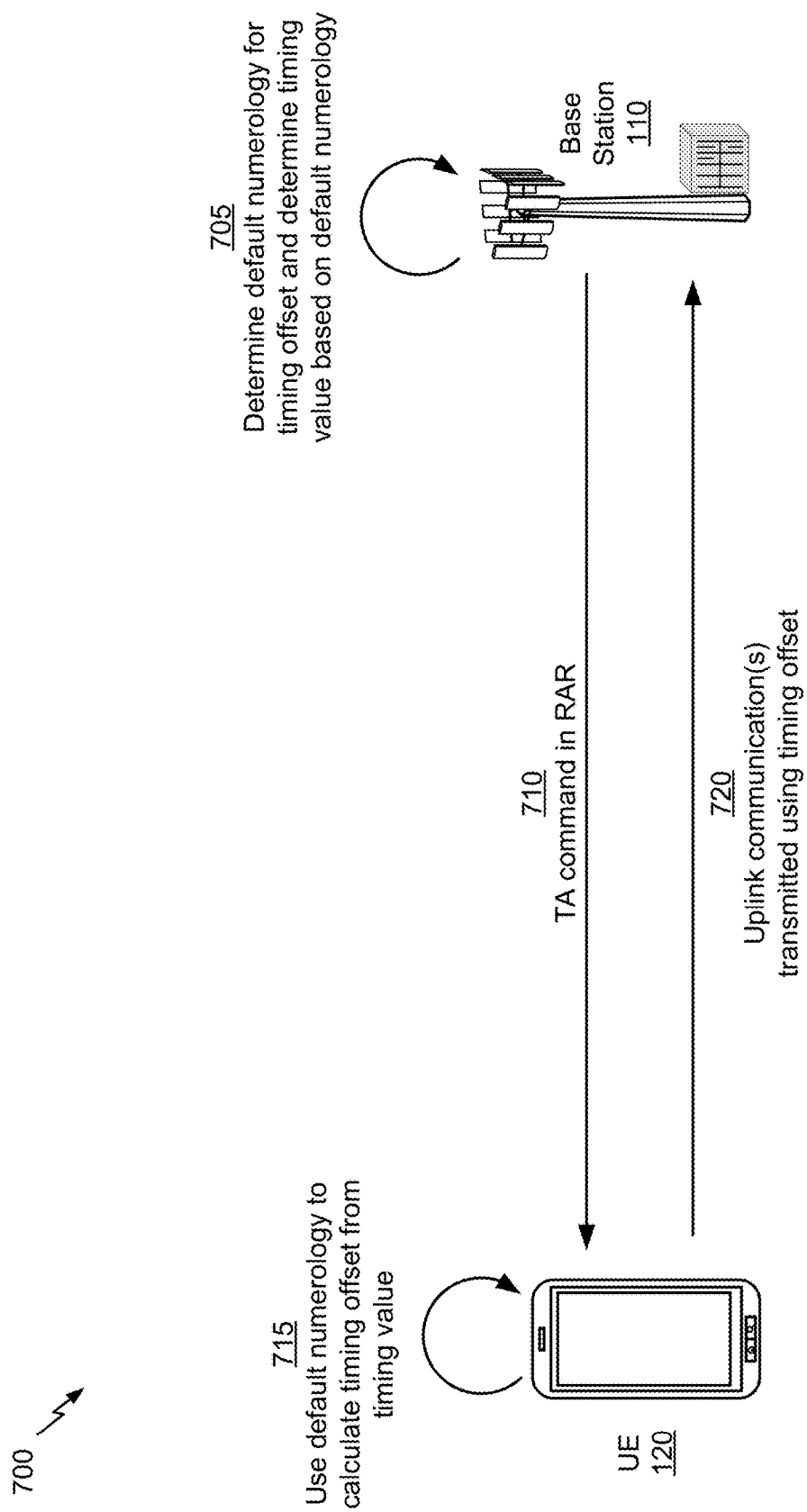

FIG. 7 is a diagram illustrating an example 700 of using different timing advance values for different numerologies, in accordance with various aspects of the present disclosure.

As shown by reference number 705, a base station 110 may determine a numerology to be used to calculate a timing offset to be applied by a UE 120 to adjust a timing of an uplink transmission, and may determine a timing value for calculating the timing offset based at least in part on the numerology, in a similar manner as described above in connection with FIG. 5. In some aspects, the base station 110 may use a default numerology, such as when an RRC message indicating a numerology has not yet been transmitted to the UE 120. For example, the base station 110 and the UE 120 may need to synchronize timing during a random access channel (RACH) procedure, prior to transmission of an RRC message that indicates a numerology negotiated between the UE 120 and the base station 110. In this case, the UE 120 and the base station 110 may both use a default numerology to permit timing to be aligned.

As shown by reference number 710, the base station 110 may transmit, and the UE 120 may receive, the TA command in a random access response (RAR). In this case, the numerology may be a default numerology, such as a preconfigured, a hard-coded numerology, a numerology defined according to a 3GPP specification, and/or the like. For example, the default numerology may be 15 kHz, 30 kHz, 60 kHz, or the like. In some aspects, the base station 110 may estimate an initial timing value based at least in part on a communication received from the UE 120 on a physical random access control channel (PRACH). Additionally, or alternatively, a PRACH communication may be used as a timing reference during initial access by the UE 120, as part of radio link failure, during a handover, and/or the like. In these cases, the base station 110 may send the TA command in the RAR to the PRACH communication. After the UE 120 is in connected mode, the base station 110 may continue to estimate the timing value, and may send the timing value in a TA command transmitted in a MAC control element if timing correction is required, as described above in connection with FIG. 6.

As shown by reference number 715, the UE 120 may determine a numerology to be used to calculate the timing offset from the timing value, and may calculate a timing offset, to be applied to adjust a timing of an uplink transmission, using the timing value and the numerology, in a similar manner as described above in connection with FIG. 5. As shown in FIG. 6, when the TA command is received in a RAR, the UE 120 may use a default numerology.

As shown by reference number 720, the UE 120 may transmit, and the base station 110 may receive, an uplink communication with a timing adjusted using the timing offset, in a similar manner as described above in connection with FIG. 5. In this way, a time difference at the base station 110 between reception of uplink communications from the UE 120 and a subframe timing used by the base station 110 may be reduced or eliminated, a timing between the UE 120 and the base station 110 may be aligned and/or synchronized, a likelihood of collision between uplink transmissions from different UEs 120 may be reduced, interference between such UEs 120 may be reduced or eliminated, and/or the like.

As indicated above, FIG. 7 is provided as an example. Other examples are possible and may differ from what was described with respect to FIG. 7.

Figure 8:
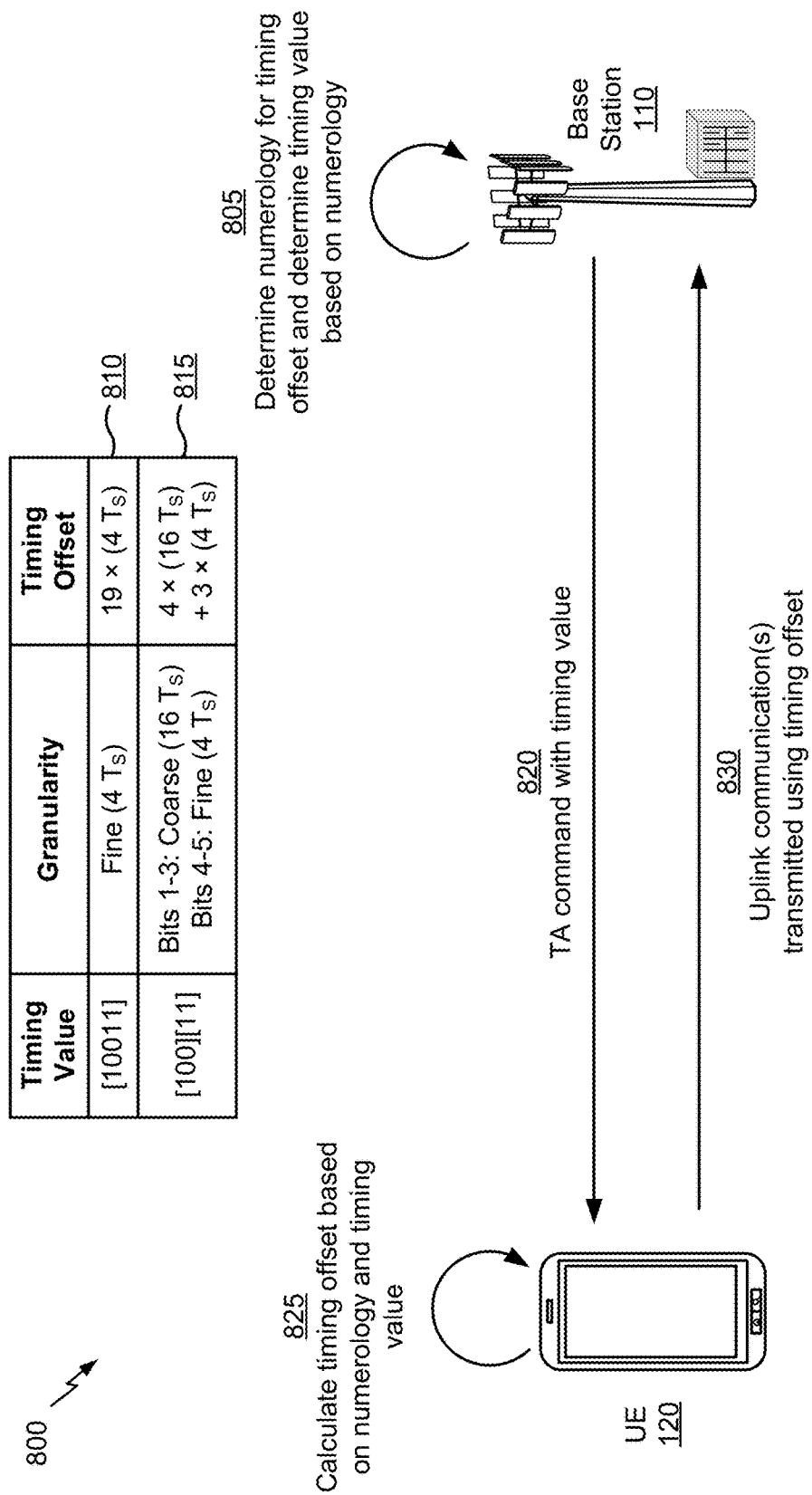

FIG. 8 is a diagram illustrating an example 800 of using different timing advance values for different numerologies, in accordance with various aspects of the present disclosure.

As shown by reference number 805, a base station 110 may determine a numerology to be used by a UE 120 to calculate a timing offset to be applied by the UE 120 to adjust a timing of an uplink transmission, and may determine a timing value for calculating the timing offset based at least in part on the numerology, in a similar manner as described above in connection with FIG. 5.

As shown by reference number 810, in some aspects, the timing value may include a set of bits used to calculate the timing offset using a granularity that depends on the numerology, and the set of bits are interpreted as a whole using the granularity. For example, the bit sequence 10011 may be interpreted as a whole to represent a value of 19, and that value may be applied to a granularity associated with a numerology. For example, a fine granularity of $4 \times T_S$ may be multiplied by the value of 19 to calculate a timing offset for adjusting timing of an uplink communication.

As shown by reference number 815, alternatively, the timing value may include a first set of bits used to calculate an unadjusted timing offset using a first granularity and a second set of bits used to calculate the timing offset by adjusting the unadjusted timing offset using a second granularity that is finer than the first granularity. For example, the bit sequence 10011 may be interpreted as a first set of bits 100 (e.g., the first 3 bits) that represents a first value of 4 and a second set of bits 11 (e.g., the last 2 bits) that represents a second value of 3. The first value of 4 may be applied to a first granularity associated with a numerology, and the second value of 3 may be applied to a second granularity associated with the numerology. For example, a coarse granularity of $16 \times T_S$ may be multiplied by the first value of 4 to calculate an unadjusted timing offset, and a fine granularity of $4 \times T_S$ may be multiplied by the second value of 3 to calculate an adjustment factor. The unadjusted timing offset and the adjustment factor may be added to calculate a timing offset for adjusting timing of an uplink communication.

While the TA command is shown as being 5 bits in length as an example, in practice, the TA command may include a different number of bits, such as 13 bits. Furthermore, while the first set of bits is shown as being 3 bits in length and the second set of bits is shown as being 2 bits in length, in practice, the first and/or second set of bits may include a different number of bits. For example, the first set of bits may include 12 bits, 11 bits, 10 bits, and/or the like, and the second set of bits may include 1 bit, 2 bits, 3 bits, and/or the like. In some aspects, a particular set of bits may be configured to represent the adjustment factor, such as the first two bits (e.g., the most significant bits), the last two bits (e.g., the least significant bits), and/or the like.

As shown by reference number 820, the base station 110 may transmit, and the UE 120 may receive, a TA command that includes the timing value, in a similar manner as described above in connection with FIGS. 5-7.

As shown by reference number 825, the UE 120 may determine a numerology to be used to calculate the timing offset from the timing value, and may calculate a timing offset, to be applied to adjust a timing of an uplink transmission, using the timing value and the numerology, in a similar manner as described above in connection with FIGS. 5-7. In some aspects, the UE 120 may interpret the timing value as a whole by applying a single granularity to the entire set of bits included in the timing value, as described above. Alternatively, the UE 120 may interpret the timing value by applying a first granularity to a first set of bits included in the timing value, and by applying a second granularity to a second set of bits included in the timing value, as described above. In some aspects, the base station 110 may indicate, to the UE 120, a configuration for interpreting the timing value (e.g., applying a single granularity or multiple granularities to the bits of the timing value).

As shown by reference number 830, the UE 120 may transmit, and the base station 110 may receive, an uplink communication with a timing adjusted using the timing offset, in a similar manner as described above in connection with FIGS. 5-7. In this way, a time difference at the base station 110 between reception of uplink communications from the UE 120 and a subframe timing used by the base station 110 may be reduced or eliminated, a timing between the UE 120 and the base station 110 may be aligned and/or synchronized, a likelihood of collision between uplink transmissions from different UEs 120 may be reduced, interference between such UEs 120 may be reduced or eliminated, and/or the like.

As indicated above, FIG. 8 is provided as an example. Other examples are possible and may differ from what was described with respect to FIG. 8.

FIG. 9 is a diagram illustrating an example process 900 performed, for example, by a UE, in accordance with various aspects of the present disclosure. Example process 900 is an example where a UE (e.g., UE 120 and/or the like) performs operations associated with using different timing advance values for different numerologies.

As shown in FIG. 9, in some aspects, process 900 may include receiving a timing advance (TA) command that includes a timing value for calculating a timing offset to be applied to adjust a timing of an uplink transmission (block 910). For example, the UE (e.g., using antenna 252, DEMOD 254, MIMO detector 256, receive processor 258, controller/processor 280, and/or the like) may receive a TA command that includes a timing value for calculating a timing offset to be applied to adjust a timing of an uplink transmission, as described above in connection with FIGS. 5-8.

As further shown in FIG. 9, in some aspects, process 900 may include determining a numerology to be used to calculate the timing offset from the timing value (block 920). For example, the UE (e.g., using controller/processor 280 and/or the like) may determine a numerology to be used to calculate the timing offset from the timing value, as described above in connection with FIGS. 5-8.

As further shown in FIG. 9, in some aspects, process 900 may include calculating the timing offset using the timing value and the numerology, wherein the timing value corresponds to different timing offsets for different numerologies (block 930). For example, the UE (e.g., using controller/processor 280 and/or the like) may calculate the timing offset using the timing value and the numerology, as described above in connection with FIGS. 5-8. In some aspects, the timing value corresponds to different timing offsets for different numerologies.

Process 900 may include additional aspects, such as any single aspect or any combination of aspects described below and/or in connection with one or more other processes described elsewhere herein.

In some aspects, the numerology is 15 kilohertz (kHz) or 30 kHz for enhanced mobile broadband (eMBB) communications or when ultra-reliable low latency communication (URLLC) is not configured for the UE. In some aspects, the numerology is 30 kilohertz (kHz) or 60 kHz when ultra-reliable low latency communication (URLLC) is configured for the UE.

In some aspects, the TA command is received in a medium access control (MAC) control element. In some aspects, the numerology is determined using an indication in a radio resource control (RRC) message when the TA command is received in the MAC control element. In some aspects, the numerology is indicated in a radio resource control (RRC) message. In some aspects, the numerology is a numerology being used for communications between the UE and a base station.

In some aspects, the TA command is received in a random access response (RAR) message. In some aspects, the numerology is determined using a default numerology when the TA command is received in the RAR message. In some aspects, the numerology is a default numerology.

In some aspects, the timing value is a single timing value used to calculate timing offsets for multiple numerologies. In some aspects, the single timing value is determined based at least in part on a largest numerology of the multiple numerologies. In some aspects, the single timing value is used to derive different timing offsets for different numerologies.

In some aspects, the timing value is a first timing value used to calculate a first timing offset for a first numerology, and wherein a second timing value is used to calculate a second timing offset for a second numerology. In some aspects, the first timing value and the second timing value are indicated in a same TA command. In some aspects, the first timing value and the second timing value are indicated in different TA commands.

In some aspects, a granularity of the timing value depends on the numerology. In some aspects, the granularity is the same across multiple cells in a TA group that supports ultra-reliable low latency communication (URLLC). In some aspects, a first TA group that supports ultra-reliable low latency communication (URLLC) uses a different granularity for the timing value than a second TA group that does not support URLLC.

In some aspects, the timing value is a set of bits used to calculate the timing offset using a granularity that depends on the numerology, wherein the set of bits are interpreted as a whole using the granularity. In some aspects, the timing value includes a first set of bits used to calculate an unadjusted timing offset using a first granularity and a second set of bits used to calculate the timing offset by adjusting the unadjusted timing offset using a second granularity that is finer than the first granularity.

In some aspects, different timing values correspond to a same timing offset for different numerologies. In some aspects, the timing of the uplink transmission is adjusted using the timing offset.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
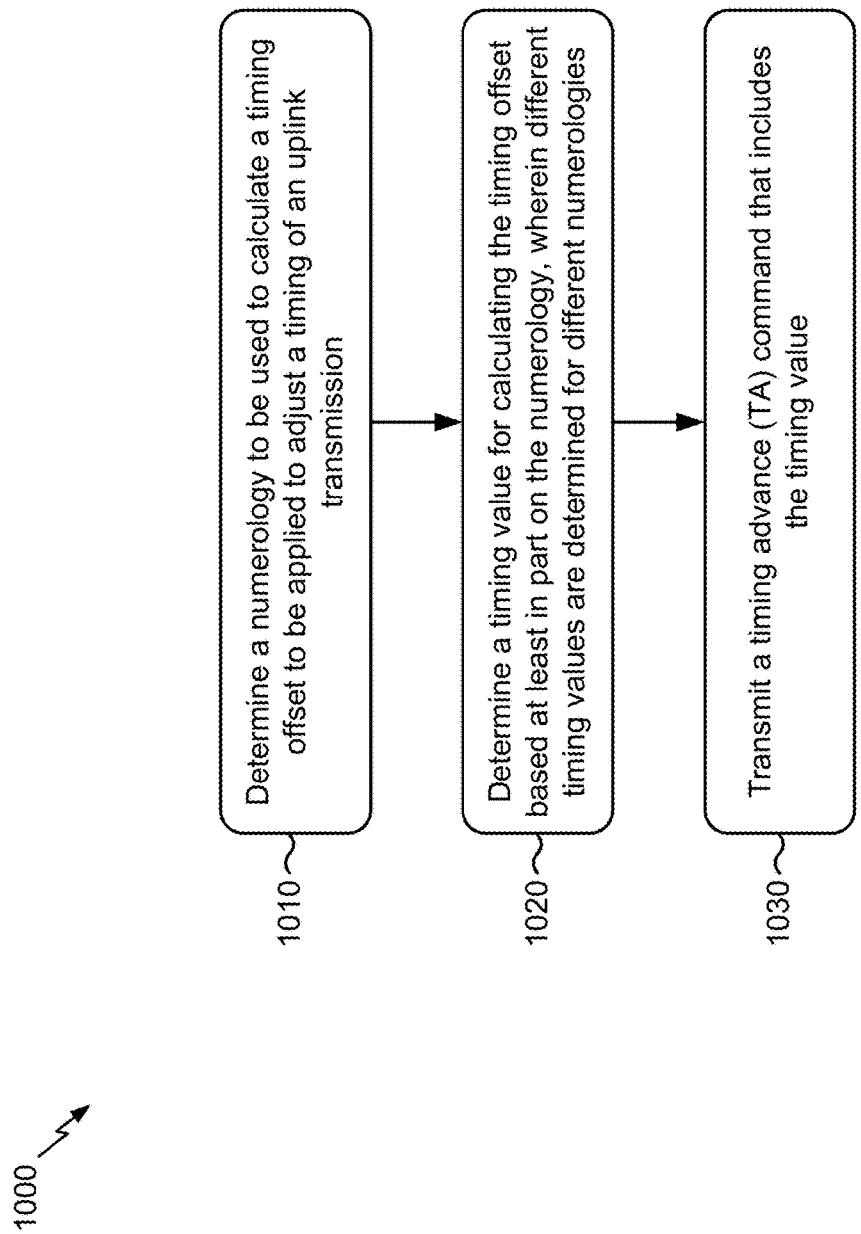

FIG. 10 is a diagram illustrating an example process 1000 performed, for example, by a base station, in accordance with various aspects of the present disclosure. Example process 1000 is an example where a base station (e.g., base station 110 and/or the like) performs operations associated with using different timing advance values for different numerologies.

As shown in FIG. 10, in some aspects, process 1000 may include determining a numerology to be used to calculate a timing offset to be applied to adjust a timing of an uplink transmission (block 1010). For example, the base station (e.g., using controller/processor 240 and/or the like) may determine a numerology to be used to calculate a timing offset to be applied to adjust a timing of an uplink transmission, as described above in connection with FIGS. 5-8.

As further shown in FIG. 10, in some aspects, process 1000 may include determining a timing value for calculating the timing offset based at least in part on the numerology, wherein different timing values are determined for different numerologies (block 1020). For example, the base station (e.g., using controller/processor 240 and/or the like) may determine a timing value for calculating the timing offset based at least in part on the numerology, as described above in connection with FIGS. 5-8. In some aspects, different timing values are determined for different numerologies.

As further shown in FIG. 10, in some aspects, process 1000 may include transmitting a timing advance (TA) command that includes the timing value (block 1030). For example, the base station (e.g., using transmit processor 220, TX MIMO processor 230, controller/processor 240, MOD 232, antenna 234, and/or the like) may transmit a TA command that includes the timing value, as described above in connection with FIGS. 5-8.

Process 1000 may include additional aspects, such as any single aspect or any combination of aspects described below and/or in connection with one or more other processes described elsewhere herein.

In some aspects, the numerology is 15 kilohertz (kHz) or 30 kHz for enhanced mobile broadband (eMBB) communications or when ultra-reliable low latency communication (URLLC) is not configured. In some aspects, the numerology is 60 kHz when ultra-reliable low latency communication (URLLC) is configured.

In some aspects, the TA command is transmitted in a medium access control (MAC) control element. In some aspects, the numerology is indicated in a radio resource control (RRC) message. In some aspects, the numerology is a numerology being used for communications between a user equipment (UE) and the base station.

In some aspects, the TA command is transmitted in a random access response (RAR) message. In some aspects, the numerology is a default numerology. In some aspects, the timing value is a single timing value used to calculate timing offsets for multiple numerologies. In some aspects, the single timing value is determined based at least in part on a largest numerology of the multiple numerologies. In some aspects, the single timing value is used to derive different timing offsets for different numerologies.

In some aspects, the timing value is a first timing value used to calculate a first timing offset for a first numerology, and wherein a second timing value is used to calculate a second timing offset for a second numerology. In some aspects, the first timing value and the second timing value are indicated in a same TA command. In some aspects, the first timing value and the second timing value are indicated in different TA commands.

In some aspects, a granularity of the timing value depends on the numerology. In some aspects, the granularity is the same across multiple cells in a TA group that supports ultra-reliable low latency communication (URLLC). In some aspects, a first TA group that supports ultra-reliable low latency communication (URLLC) uses a different granularity for the timing value than a second TA group that does not support URLLC.

In some aspects, the timing value is a set of bits to be used to calculate the timing offset using a granularity that depends on the numerology, wherein the set of bits are to be interpreted as a whole using the granularity. In some aspects, the timing value includes a first set of bits to be used to calculate an unadjusted timing offset using a first granularity and a second set of bits to be used to calculate the timing offset by adjusting the unadjusted timing offset using a second granularity that is finer than the first granularity. In some aspects, different timing values correspond to a same timing offset for different numerologies.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:

receiving a timing advance (TA) command that includes a timing value for calculating a timing offset to be applied to adjust a timing of an uplink transmission, wherein the timing value includes a first set of bits used to calculate an unadjusted timing offset using a first granularity and a second set of bits used to calculate the timing offset by adjusting the unadjusted timing offset using a second granularity that is finer than the first granularity;

determining a numerology to be used to calculate the timing offset from the timing value;

calculating the timing offset using the timing value and the numerology, wherein the timing value corresponds to different timing offsets for different numerologies; and sending the uplink transmission according to the timing offset.

2. The method of claim 1, wherein the numerology is 15 kilohertz (kHz) or 30 kHz for enhanced mobile broadband (eMBB) communications or when ultra-reliable low latency communication (URLLC) is not configured for the UE, or wherein the numerology is 30 kHz or 60 kHz when URLLC is configured for the UE.

3. The method of claim 1, wherein the TA command is received in a medium access control (MAC) control element.

4. The method of claim 3, wherein the numerology is determined using an indication in a radio resource control (RRC) message when the TA command is received in the MAC control element.

5. The method of claim 1, wherein the numerology is indicated in a radio resource control (RRC) message.

6. The method of claim 1, wherein the TA command is received in a random access response (RAR) message.

7. The method of claim 6, wherein the numerology is determined using a default numerology when the TA command is received in the RAR message.

8. The method of claim 1, wherein the numerology is a default numerology.

9. The method of claim 1, wherein the timing value is a single timing value used to calculate timing offsets for multiple numerologies.

10. The method of claim 9, wherein the single timing value is determined based at least in part on a largest numerology of the multiple numerologies.

11. The method of claim 1, wherein the timing value is a first timing value used to calculate a first timing offset for a first numerology, and wherein a second timing value is used to calculate a second timing offset for a second numerology.

12. The method of claim 1, wherein a granularity of the timing value depends on the numerology.

13. The method of claim 12, wherein the granularity is the same across multiple cells in a TA group that supports ultra-reliable low latency communication (URLLC).

14. The method of claim 1, wherein a first TA group that supports ultra-reliable low latency communication (URLLC) uses a different granularity for the timing value than a second TA group that does not support URLLC.

15. The method of claim 1, wherein the timing of the uplink transmission is adjusted using the timing offset.

16. A method of wireless communication performed by a base station, comprising:

determining a numerology to be used to calculate a timing offset to be applied to adjust a timing of an uplink transmission;

determining a timing value for calculating the timing offset based at least in part on the numerology, wherein different timing values are determined for different numerologies; and transmitting a timing advance (TA) command that includes the timing value,
wherein the timing value includes a first set of bits used to calculate an unadjusted timing offset using a first granularity and a second set of bits used to calculate the timing offset by adjusting the unadjusted timing offset using a second granularity that is finer than the first granularity.

17. The method of claim 16, wherein the TA command is transmitted in a medium access control (MAC) control element, and wherein the numerology is indicated in a radio resource control (RRC) message.

18. The method of claim 16, wherein the TA command is transmitted in a random access response (RAR) message, and wherein the numerology is a default numerology.

19. The method of claim 16, wherein the timing value is a single timing value used to calculate timing offsets for multiple numerologies.

20. The method of claim 19, wherein the single timing value is determined based at least in part on a largest numerology of the multiple numerologies.

21. The method of claim 16, wherein the timing value is a first timing value used to calculate a first timing offset for a first numerology, and wherein a second timing value is used to calculate a second timing offset for a second numerology.

22. The method of claim 16, wherein a granularity of the timing value depends on the numerology.

23. The method of claim 22, wherein the granularity is the same across multiple cells in a TA group that supports ultra-reliable low latency communication (URLLC).

24. The method of claim 16, wherein a first TA group that supports ultra-reliable low latency communication (URLLC) uses a different granularity for the timing value than a second TA group that does not support URLLC.

25. A user equipment (UE) for wireless communication, comprising:
memory; and
one or more processors operatively coupled to the memory, the memory and the one or more processors configured to:
receive a timing advance (TA) command that includes a timing value for calculating a timing offset to be applied to adjust a timing of an uplink transmission, wherein the timing value includes a first set of bits used to calculate an unadjusted timing offset using a first granularity and a second set of bits used to calculate the timing offset by adjusting the unadjusted timing offset using a second granularity that is finer than the first granularity;
determine a numerology to be used to calculate the timing offset from the timing value;
calculate the timing offset using the timing value and the numerology, wherein the timing value corresponds to different timing offsets for different numerologies; and
send the uplink transmission according to the timing offset.

26. A base station for wireless communication, comprising:
memory; and
one or more processors operatively coupled to the memory, the memory and the one or more processors configured to:
determine a numerology to be used to calculate a timing offset to be applied to adjust a timing of an uplink transmission;
determine a timing value for calculating the timing offset based at least in part on the numerology, wherein different timing values are determined for different numerologies; and
transmit a timing advance (TA) command that includes the timing value,
wherein the timing value includes a first set of bits used to calculate an unadjusted timing offset using a first granularity and a second set of bits used to calculate the timing offset by adjusting the unadjusted timing offset using a second granularity that is finer than the first granularity.

* * * * *